United States Patent Office 3,591,535
Patented July 6, 1971

3,591,535
HIGH MOLECULAR WEIGHT/LOW MOLECULAR WEIGHT PHENOL-FORMALDEHYDE CURTAIN COATING ADHESIVE COMPOSITION
Reino A. Jarvi, Bellevue, Wash., assignor to Simpson Timber Company, Seattle, Wash.
No Drawing. Continuation-in-part of application Ser. No. 751,687, July 31, 1968. This application July 25, 1969, Ser. No. 845,082
Int. Cl. C08b *21/32;* C08g *5/06, 37/08*
U.S. Cl. 260—14   7 Claims

ABSTRACT OF THE DISCLOSURE

A phenol-formaldehyde adhesive composition for use in a gravity curtain coater is prepared by mixing together a high molecular weight, highly advance, phenol-formaldehyde resin, a low molecular weight, long-flow, phenol-formaldehyde resin, anionic surfactant having particular characteristics, and a thickening agent in specified portions. The resins are preferably formulated by condensing 1.8 to 1 to 2.2 to 1 moles formaldehyde to phenol under reflux conditions to a viscosity of from 200–250 cps. at 70° F. in the presence of not over 10 wt. percent of an alkaline catalyst based on the weight of the resin constituents, removing and cooling a portion of the resin, heating the remainder of the resin under reflux conditions to a viscosity of from 900–1000 cps. at 70° F., adding the removed resin portion to the remaining portion, and cooling the entire mixture. The final resin mixture has a viscosity of 600–800 cps. at 70° F.

CROSS-REFERENCE TO RELATED APPLICATION

This application is a continuation-in-part application of Ser. No. 751,687, filed July 31, 1968, and now abandoned.

BACKGROUND OF THE INVENTION

Field of the invention

This invention relates to a phenol-formaldehyde adhesive composition useful in a gravity curtain coater and a method of making and using such an adhesive composition.

PRIOR ART RELATING TO THE DISCLOSURE

Commonly used adhesives in the manufacture of exterior grade plywoods have phenolic or phenolic derivative bases. These resins typically have a resin solids content of about 40% to 50%. The 40% solids adhesives commonly used are highly advanced, high molecular weight phenolic resins formulated in general in accordance with the teachings of U.S. Pat. No. 2,457,493, reissued 23,347 and are referred to as Redfern type resins. The 50% resins solids adhesives are relatively low molecular weight, long-flow phenolic resins commonly used for hot bark extension.

The 40% resin solids Redfern type phenolic resins require a higher glue spread weight than the 50% resin solids or low molecular weight extended adhesives, and therefore, introduce more moisture into the glue line. This can result in blistering or blows in the manufacture of plywood unless precautions are taken to minimize steam generation in the glue lines. The 40% resin solids or high molecular weight resins also tend to dry out more quickly than the longer flow 50% or low molecular weight resins and are therefore more sensitive to long assembly times. High molecular weight resins are now commonly used in combination with finely ground fibrous fillers as a mixed adhesive in order to control the resin solids spread weight on a grooved rubber roll spreader.

The 50% resin solids or low molecular weight phenolic resins are generally suitable for plywood manufacture only where relatively long press times can be tolerated because of sufficient press capacity. The low molecular weight adhesives generally result in a savings because of the lower spread weight required. For example, a ⅜₆" core with a typical Redfern type high molecular weight adhesive requires about 65 pounds of adhesive per 1,000 square feet of double glue line, whereas bark extended adhesives using low molecular weight adhesives require only about 50 to 55 pounds per 1,000 square feet of double glue line.

Because of the common practice of using high and low molecular weight resins with fillers, i.e. as mixed glues, these resins are limited to being applied by roll type glue spreaders. Unless such spreaders are closely supervised, however, glue spread weight varies widely resulting in inferior plywood. Variation in glue spread weight can be caused by uneven veneer thickness or veneer having a uniform thickness that deviates from a standard thickness. A light spread of adhesive on veneer can result in a dried out glue line whereas a heavy adhesive spread can result in an under cured glue line. Due to inherent variations in the thickness of plywood veneer peeled to a standard thickness it is desirable to apply the glue without having to be dependent upon the thickness of the veneer, as is the case when a roll type glue spreader is used. One type of glue spreader that eliminates this dependency upon veneer thickness is a curtain coater, gravity or pressure. A gravity curtain coater is preferred as it is not necessary to filter the viscous adhesive composition. Instead the adhesive composition is run through a series of screens ranging from coarse to fine to remove gelled particles and other materials which would likely cause curtain breaks. A gravity curtain coater also has fewer maintenance problems associated with it as compared to a pressure curtain coater where the pressure exerted on the material must be maintained substantially constant at all times.

The known low and high molecular weight adhesives are not suitable for application by gravity curtain coaters because of interference by filler materials which are normally used in the adhesive compositions and which result in curtain breaks.

A primary object of this invention is to provide an adhesive composition formulated with no filler materials which has a relatively long assembly time, a relatively short press time, a relatively low moisture content, and relatively little strike in. Another is to provide an adhesive composition that can be used in a gravity curtain coater applicator.

A further object is to provide an adhesive composition that has a relatively long storage life allowing the adhesive composition to be shipped in bulk from an adhesive manufacturing plant to a plywood fabricating plant.

Another object of this invention is to eliminate mixing of the adhesive composition at the plywood fabricating plant.

SUMMARY OF THE INVENTION

In general the adhesive composition of this invention comprises a mixture of a highly advanced, high molecular weight, alkaline base phenolic resin and a low molecular weight, long-flow alkaline base phenolic resin, the mixture of resins blended with suitable thickeners and an anionic surfactant having particular characteristics.

DETAILED DESCRIPTION OF THE INVENTION

The highly advanced resin is a phenol-formaldehyde resin produced by condensing phenol and formaldehyde in the presence of an alkali hydroxide catalyst in an amount expressed as equivalent to sodium hydroxide of not over 10 wt. percent sodium hydroxide and preferably between about 6.5 and 8 wt. percent based on the total weight of the constituents of the highly advanced resin. The molar ratio of formaldehyde to phenol should range between about 1.8 to 1 to 2.2 to 1 and the resin composition should have a stroke cure at 250° F. of between about 7 and 10 seconds and a resins solids content of about 40% (±2%).

The low molecular weight, long-flow resin is made by condensing 1.8 to 1 to 2.2 to 1 moles formaldehyde to phenol in the presence of an alkaline hydroxide catalyst. The amount of catalyst expressed as equivalent to sodium hydroxide should not be greater than about 10 wt. percent sodium hydroxide and preferably 2.5-4 wt. percent based on the total weight of the constituents of the low molecular weight resin. The final resin should have a solids content of about 50% ±2% and a stroke cure at 300° F. of 10-14 seconds. The resins, both high and low molecular weight, are condensed in an aqueous media to yield a resin syrup.

When the two resins are mixed together and applied to a plywood veneer a gel structure is formed that prevents excessive strike-in. The long-flow resin acts as a fluxing agent that causes the highly advanced resin to liquify upon application of heat and pressure when the the plywood veneers are pressed, even though the highly advanced resin has begun to dry. As a result the resin mixture of this invention has a relatively long assembly time and a relatively short pressing time.

Ingredients of two exemplary highly advanced and long-flow resins are given in Table 1.

TABLE 1

| | Weight percent | |
| --- | --- | --- |
| | Highly advanced 40% solids | Long flow 50% solids |
| Phenol | 22.4 | 34.9 |
| 37% formaldehyde | 33.6 | 37.6 |
| 50% NaOH | 15.6 | 7.0 |
| Water | 28.4 | .5 |

The high and low molecular weight resins can be prepared separately and mixed together or they can be prepared by the following alternative procedure. By this procedure formaldehyde and phenol in a mole ratio of from 1.8 to 1 to 2.2 to 1 are condensed together in the presence of an alkaline catalyst under reflux conditions to a viscosity of from 200 to 250 centipoises at 70° F. A portion of the resin, preferably from 15 to 30 weight percent based on the total resin mixture is then removed and the remaining resin allowed to continue cooking under reflux conditions to a viscosity of from 900 to 1000 centipoises at 70° F. At that time the portion of the resin removed is then added to the remaining portion and the whole cooled to room temperature. The resulting resin mixture should have a viscosity of from 600-800 cps. at 70° F. and consists of a mixture of high and low molecular weight resins suitable for formulation of an adhesive composition useful in coating veneer using a gravity curtain coater. If the viscosity of the resin mixture is much above 800 cps. air entrainment becomes a problem.

To the resin mixture is added an alkali-stable thickening agent to assist in controlling the adhesive viscosity and strike-in while permitting necessary water dilution. By the term "alkali-stable" is meant a thickening agent that is stable when boiled in a 10% hydroxide solution for 24 hours. The water soluble cellulose derivatives are suitable thickening agents such as hydroxyethylcellulose, carboxymethylcellulose and methylcellulose. The preferred one is hydroxyethylcellulose. The thickening agents should be present in an amount between about 0.1 and 0.2 wt. percent based on the weight of the resin syrup.

An alkali-stable anionic surfactant is needed in the adhesive composition to produce the strong surface tension of the phenolic adhesive mixture. Use of an alkali-stable anionic surfactant is essential in curtain coating applications. The term "alkali-stable" is defined in the previous paragraph. Anionic surfactants which may be used must (1) have the ability to produce a surface tension in the final adhesive composition of 30 to 55 dynes per centimeter; (2) be completely inert to the adhesive composition; (3) be compatible with the adhesive composition; and (4) yield a clear adhesive composition instead of a milky one. A preferred anionic surfactant is sodium-2-ethylhexyl sulfate. The surfactant should be present in an amount between about 1.0 wt. percent and 2.0 wt. percent based on the weight of the total resin components. The amount of surfactant depends, to some extent, on the purity of the surfactant.

In general, adhesive mixtures prepared in accordance with the invention have longer assembly and press times as the proportion of long-flow resin is increased relative to the proportion of highly advanced resin. When less than about 20% by wt. of the total resin components of the adhesive constitutes long-flow resin, the dry-out characteristics of the highly advanced resin predominate. When more than about 50% of the total resin components of the adhesive constitute long-flow resin, the press time of the adhesive increases without a concomitant and proportional increase in assembly time. Thus the preferred adhesive mixture of this invention contains between about 80% and 50% by wt. of highly advanced resin.

Sufficient water is included in the final adhesive composition to yield a resin solids content of not less than 30% and preferably from 30 to 40% based on the total adhesive formulation.

For gravity curtain coating application, the final viscosity of the adhesive composition must be formulated within definite limits. If the composition is too thin or too thick curtain breaks become a problem. The adhesive composition of this invention must have a viscosity of between about 220 and 800 centipoises at its application temperature, generally 70 to 75° F. At a viscosity of 500 centipoises at working temperature, a curtain can be obtained that best covers rough spots and areas behind projections on veneer surfaces. It is therefore preferred that the adhesive composition having a viscosity as close to 500 centipoises as possible.

All ingredients of the adhesive composition must be completely dissolved in order to avoid curtain breaks caused by undesirable particles. Likewise particles of foreign substances such as oil or immiscible liquid must be kept out of the adhesive composition, as such foreign substances cause curtain breaks.

In the following examples all references are to parts by weight unless otherwise designated. Examples for resin case:

EXAMPLE I

A reaction vessel was charged with the following ingredients:

| | Parts by wt. |
| --- | --- |
| Phenol | 840 |
| Formaldehyde | 1389 |
| Water | 13.5 |
| Sodium hydroxide, 50% | 70.0 |

The mixture in the reaction vessel was heated to 176° F. until the viscosity was 275 cps. at 70-75° F. Water, 628 parts by weight, was then added directly to the reaction vessel and 410 parts by weight 50% sodium hydroxide added slowly through the condenser. Condensation was continued at 190° F. until the mixture had reached a viscosity 200-225 cps. at 70-75° F. At that time, 20% by wt. of the reaction mixture was removed from the reaction vessel and cooled. The remainder of the reaction mixture was continuously heated at reflux (about 190° F.) to a viscosity of 1,000 cps. at 70-75° F. At this time, the resin mixture earlier removed was added to the further condensed resin and the total mixture cooled to room temperature. The resulting composition was a resin mixture of about 80% of a high molecular weight formaldehyde resin and 20% by weight of a low molecular weight phenol-formaldehyde resin having a viscosity of from 600–800 cps. at 70° F.

EXAMPLE 2

The phenol-formaldehyde resin mixture of Example 1 was used to formulate an adhesive composition for use in a gravity curtain coater. The following ingredients were blended together in the proportions designated:

| | Parts by weight |
|---|---|
| Resin of Ex. 1 | 1,000 |
| Carboxymethylcellulose | 1.5 |
| Water | 160 |
| Anionic surfactant [sodium-2-(ethylhexyl) sulfatel] (40% aqueous solution) | 15 |

The viscosity of the adhesive composition was 390 cps. at 78° F. and the surface tension of the adhesive composition was 45.2 dynes/cm.

EXAMPLE 3

Three-ply 5/16" Douglas fir plywood was continuously manufactured by coating an unbroken line of core stock with the adhesive composition of Example 2 using a gravity curtain coater. The completed assembly was then placed in a conventional plywood press and pressed for 5 minutes at 300° F. under 175 p.s.i. pressure. The plywood was then removed and cooled. Tests were run on the plywood to determine its properties. The test was a standard American Plywood Association (APA) vacuum-pressure cold soak test. The test is designed to test the bond strength with the wood fiber almost completely saturated with water. "Percent wood failure" denotes the percentage of wood failure prior to adhesive failure. "Load" denotes the number of pounds per square inch pressure at which the plywood panels failed in shear. The results are shown in Table II:

Table II

| Percent wood failure: | Load, p.s.i. |
|---|---|
| 94 | 231 |
| 100 | 298 |
| 97 | 248 |
| 96 | 281 |
| 100 | 214 |
| 100 | 230 |

Average—98.

EXAMPLE 4

The phenol-formaldehyde resin mixture of Example 1 was formulated in one operation instead of removing a portion of the resin at a viscosity of 250–300 cps. at 70° F. As shown in Example 6 the bond strength of plywood manufactured using the resin mixture of Example 4 was inadequate. A phenol-formaldehyde resin was formulated by charging a reaction vessel with the following ingredients:

| | Parts by wt. |
|---|---|
| Phenol | 840 |
| Formaldehyde | 1389 |
| Water | 13.5 |
| Sodium hydroxide (50%) | 70 |

The reaction mixture was reacted at 180° F. to a viscosity of 275 cps. 70° F. Then 628 parts water and 410 parts 50% sodium hydroxide were added and heating continued at 190° F. to a viscosity of about 550 cps. at 70° F. Phenol, 210 parts, 347 parts formaldehyde, and 440 parts water were added, and the reaction continued. Through the condenser was then added 120 parts, 50% sodium hydroxide and 20 parts water. Condensation was continued at about 180° F. to a viscosity of about 750 cps. at 70° F. The reaction mixture was then cooled. The final resin had a viscosity of 800 cps. at 70° F., a free sodium hydroxide content of 6.98%, a free formaldehyde content of 0.29%, a pH of 12.1, a resin solids content of 43.7% and a curing time determined by the dry rubber test of 9.5 seconds.

EXAMPLE 5

The phenol-formaldehyde resin of Example 4 was used to formulate an adhesive composition for use with a gravity curtain coater.

The formulated adhesive composition was the same as that described in Example 2 with the exception of the phenol-formaldehyde resin.

EXAMPLE 6

The adhesive composition of Example 5 was used in the manufacture of 5-ply 13/16" Douglas fir using a gravity curtain coater. The spread weight (gms. per sq. ft.) was approximately 11.0. After the plywood panels were assembled, they were pressed for 7 minutes at 300° F. and at a pressure 175 p.s.i. The plywood panels were then removed from the press and subjected to the vacuum-pressure cold soak test. The results of the test were as follows:

Table III

| Percent wood failure: | Load, p.s.i. |
|---|---|
| 33 | 229 |
| 69 | 172 |
| 94 | 156 |
| Delaminated | — |
| 26 | 230 |
| 89 | 165 |
| 99 | 223 |
| 77 | 157 |

Average—70.

As is apparent, the bonding qualities of the adhesive and the strength of the plywood were substantially less than that of the plywood produced using the adhesive composition of this invention.

EXAMPLE 7

An adhesive composition was prepared using the highly advanced 40 percent resin solids resin described in the application. The adhesive composition was formulated as follows:

| | Parts |
|---|---|
| Highly advanced resin solids resin | 1000 |
| Carboxymethylcellulose | 1.5 |
| Water | 150 |
| Sodium-2-ethyl sulfate (40% aqueous solution) | 15 |

The final adhesive composition had a viscosity of 250–350 cps. at 70° F.

The resin prepared above was used in a gravity curtain coater to coat core stock in the manufacture of 5-ply 9/16" plywood. The spread wt. (grams per sq. ft.) of the adhesive composition was 11.0. After the plywood had been assembled it was pressed at 290° F. for 5½ minutes at 175 p.s.i. The adhesive composition did not curtain satisfactorily in the gravity curtain coater.

EXAMPLE 8

An adhesive composition was prepared having the following composition:

| | Prats by wt. |
|---|---|
| Resin of Example 1 | 1000 |
| Sodium-2-ethylhexyl sulfate (40% aqueous solution) | 15.0 |

The adhesive composition had a viscosity of 700 cps. at 65° F.

EXAMPLE 9

Five-ply plywood was made 13/16" Douglas fir veneer and the adhesive of Example 8. The spread weight of the adhesive averaged 9.9 gms./ft.$^2$. Assembly time was 5 minutes. Press time was 6½ minutes at 315° F. and 175 p.s.i. Results of the vacuum-pressure cold soak test are in Table IV.

Table IV

| Percent wood failure: | Load, p.s.i. |
| --- | --- |
| 89 | 240 |
| 54 | 205 |
| 72 | 216 |
| 55 | 202 |
| 94 | 182 |
| 94 | 188 |
| 88 | 201 |
| 92 | 171 |

The bond strength indicated by percent wood failure was inadequate to pass APA requirements. Such an adhesive composition could not be used satisfactorily in a high speed automated plywood lay-up system where continuity and uniformity of the glue spread are essential.

EXAMPLE 10

An adhesive composition was prepared using a highly advanced phenol-formaldehyde 40% solids resin having a 7 second dry rubber at 250° F. The adhesive had the following constituents:

| | Parts by wt. |
| --- | --- |
| Solids resin (40%) | 1000 |
| Carboxymethylcellulose | 1.5 |
| Water | 150 |
| Sodium salt of dodecyldiphenol ether disulfonic acid (anionic surfactant) (50% aqueous solution) | 35 |

The composition had a viscosity of 250–350 cps. at 70° F. The adhesive composition was slightly turbid and would not curtain satisfactorily using a gravity curtain coater.

EXAMPLE 11

The adhesive composition of Example 2 was used in the manufacture of 5-ply 13/16" Douglas fir plywood using an average spread weight of 11.0 gms./ft.$^2$. The adhesive composition had a viscosity of 280 cps. at 76° F. Assembly time was 5 minutes. Press time was 7–8 minutes at 300° F. and 175 p.s.i. Results of the vacuum-pressure cold soak test are in Table V.

Table V

| Percent wood failure: | Load, p.s.i. |
| --- | --- |
| 100 | 205 |
| 97 | 194 |
| 98 | 213 |
| 100 | 209 |

There were no curtain breaks during the entire run even at spread weights as low as 8 gms./ft.$^2$.

EXAMPLE 12

Interior plywood made using the adhesive composition of Example 2 with a spread weight ranging from 7.5 to 9.0 gms./ft.$^2$ had physical properties sufficient to meet APA requirements. In addition plywood could be manufactured on a competitive basis with that produced with extended resin mixes. Use of the adhesive compositions of this invention for either interior or exterior plywood manufacture obviates the need for separate adhesive mixes.

The advantages of the curtain coating adhesive composition such as described in Example 2 are many, including (1) good storage life in ready-to-use form, (2) minimum of curtain breaks, (3) no build-up of scum on the curtain coater, (4) easy clean-up of the equipment, (5) little formaldehyde odor, and (6) ability to use the composition in the manufacture of either interior or exterior plywood with only a change in spread weight.

The embodiments of the invention in which an exclusive property or privilege is claimed are defined as follows:

1. An adhesive composition suitable for application by gravity curtain coating applicator to plywood veneers comprising:
    (a) a mixture of two phenol-formaldehyde resin condensation products, the first resin being a highly advanced, high molecular weight resin and the second resin being a low molecular weight, long-flow resin, both resins prepared by condensing phenol with an excess of formaldehyde in the presence of an alkaline hydroxide catalyst under reflux conditions;
    (b) an alkali-stable, water soluble cellulose derivative thickening agent selected from the group consisting of hydroxyethylcellulose, carboxymethylcellulose and methylcellulose in an amount between about 0.1 and 0.2 weight percent based on the amount of resin syrup in the formulation;
    (c) an inert, alkali-stable anionic surfactant capable of giving a surface tension in the final adhesive composition of 30–55 dynes/cm. present in an amount between about 1.0 and 2.0 weight percent based on the weight of the total resin formulation;
    (d) water sufficient to yield a percent resin solids of not less than 30%; the final adhesive composition having a viscosity between 220–800 centipoises at a temperature of about 70° F. and a surface tension of between 30–55 dynes per centimeter.

2. The adhesive composition of claim 1 wherein the first resin has a molar ratio of formaldehyde to phenol ranging between about 1.8 to 1 to 2.2 to 1, an alkalinity equivalent to the alkalinity produced by sodium hydroxide in an amount between about 6.5 and 10.0 weight percent based on the weight of the first resin, a resin solids content of about 40% and a stroke cure at 250° F. of between 7 and 10 seconds; and the second resin has a molar ratio of formaldehyde to phenol between about 1.8 to 1 to 2.2 to 1, an alkalinity equivalent to the alkalinity produced by sodium hydroxide in an amount between about 2.5 and 4.0 weight percent based on the weight of the second resin, a resin solids content of about 50%, and a stroke cure at 300° F. of between 10 and 14 seconds.

3. The adhesive composition of claim 1 wherein the first resin has a molar ratio of formaldehyde to phenol ranging between about 1.8 to 1 to 2.2 to 1, an alkalinity equivalent to the alkalinity produced by sodium hydroxide in an amount between about 6.5 and 10.0 weight percent based on the weight of the first resin, and a viscosity of from 900 to 1000 centipoises at 70° F.; and the second resin has a molar ratio of formaldehyde to phenol ranging between about 1.8 to 1 to 2.2 to 1, an alkalinity equivalent to the alkalinity produced by sodium hydroxide in an amount between about 6.5 and 10.0 weight percent based on the weight of the second resin, and a viscosity of from 200 to 300 centipoises at 70° F.

4. The adhesive composition of claim 2 wherein the second resin constitutes between about 20 to 50 weight percent of the total weight of the first and second resin components.

5. The adhesive composition of claim 2 wherein the anionic surfactant is sodium-2-ethylhexyl sulfate.

6. A method of preparing a two component phenol-formaldehyde resin comprising:
    (a) condensing under reflux conditions 1.8 to 1 to 2.2 to 1 moles formaldehyde to phenol to a viscosity of from 200–300 centipoises at 70° F. in the presence of an amount of an alkaline catalyst equivalent to the alkalinity produced by sodium hydroxide in an amount between about 6.5 and 10.0 weight percent based on the weight of the resin, (b) removing and cooling a portion of the resin,
(c) continuing condensation of the remaining portion of the resin under reflux conditions to a viscosity of from 900–1000 centipoises at 70° F.,
(d) adding the removed resin portion to the remaining resin portion, and
(e) cooling the resin mixture to ambient temperature, the final resin mixture having a viscosity of from 600–800 centipoises at 70° F.

7. The method of claim 5 wherein the removed resin portion constitutes from 15–30 weight percent based on the weight of the total resin mixture.

References Cited

UNITED STATES PATENTS

| 2,462,253 | 2/1949 | Booty | 260—14 |
| 3,213,045 | 10/1965 | Klein et al. | 260—17.2 |

FOREIGN PATENTS

| 533,414 | 11/1956 | Canada | 260—838 |

WILLIAM H. SHORT, Primary Examiner

E. WOODBERRY, Assistant Examiner

U.S. Cl. X.R.

161—262; 260—57, 838